United States Patent
White et al.

(10) Patent No.: US 12,496,194 B2
(45) Date of Patent: Dec. 16, 2025

(54) ORTHOPAEDIC IMPLANT SYSTEM WITH BONE CONSERVING FEATURES

(71) Applicant: DePuy Ireland Unlimited Company, Ringaskiddy (IE)

(72) Inventors: Stephen E. White, Fort Wayne, IN (US); William J. Maloney, Palo Alto, CA (US)

(73) Assignee: DePuy Ireland Unlimited Company, Ringaskiddy (IE)

( * ) Notice: Subject to any disclaimer, the term of this patent is extended or adjusted under 35 U.S.C. 154(b) by 1575 days.

(21) Appl. No.: 16/863,128

(22) Filed: Apr. 30, 2020

(65) Prior Publication Data

US 2020/0345502 A1    Nov. 5, 2020

Related U.S. Application Data

(60) Provisional application No. 62/842,178, filed on May 2, 2019.

(51) Int. Cl.
*A61F 2/38* (2006.01)
*A61F 2/30* (2006.01)

(52) U.S. Cl.
CPC .... *A61F 2/389* (2013.01); *A61F 2002/30143* (2013.01); *A61F 2002/30187* (2013.01); *A61F 2002/30245* (2013.01); *A61F 2002/30878* (2013.01); *A61F 2002/30891* (2013.01); *A61F 2002/3895* (2013.01);
(Continued)

(58) Field of Classification Search
CPC .............................. A61F 2/389; A61F 2/3868
See application file for complete search history.

(56) References Cited

U.S. PATENT DOCUMENTS

| | | |
|---|---|---|
| 4,808,185 A | 2/1989 | Penenberg et al. |
| 5,176,710 A | 1/1993 | Hahn et al. |
| 6,206,927 B1 | 3/2001 | Fell et al. |

(Continued)

FOREIGN PATENT DOCUMENTS

| | | |
|---|---|---|
| JP | 2008253772 A | 10/2008 |
| JP | 2009513187 A | 4/2009 |

(Continued)

OTHER PUBLICATIONS

Definition of "match" retrieved from Merriam-Webster online dictionary; https://www.merriam-webster.com/dictionary/match# dictionary-entry-1; retrieved on Oct. 3, 2024 (Year: 2024).*

(Continued)

*Primary Examiner* — Megan Y Wolf
(74) *Attorney, Agent, or Firm* — Barnes & Thornburg LLP

(57) ABSTRACT

A tibial insert includes an articular surface and a bottom surface opposite the articular surface. The bottom surface includes one or more bone-conserving features. In some embodiments, the bottom surface may be curved to match a curvature of the articular surface such that a thickness of the tibial insert is relatively constant. In other embodiments, the bottom surface may be relatively planar but include a protrusion extending from a planar base surface to maintain a minimum thickness of the tibial insert. The described features may be incorporated in a uni-compartmental tibial prosthesis, a bi-compartmental tibial prosthesis, or a total knee prosthesis.

10 Claims, 14 Drawing Sheets

(52) U.S. Cl.
CPC ............... *A61F 2310/00023* (2013.01); *A61F 2310/00029* (2013.01); *A61F 2310/00059* (2013.01)

(56) References Cited

U.S. PATENT DOCUMENTS

| | | | |
|---|---|---|---|
| 8,142,510 | B2 | 3/2012 | Lee et al. |
| 8,968,403 | B2 | 3/2015 | Luginbuhl et al. |
| 9,402,726 | B2 | 8/2016 | Linderman et al. |
| 9,867,709 | B2 | 1/2018 | Nocco et al. |
| 9,956,048 | B2 | 5/2018 | Bojarski et al. |
| 2004/0064191 | A1 | 4/2004 | Wasielewski |
| 2004/0199249 | A1 | 10/2004 | Fell |
| 2006/0004461 | A1 | 1/2006 | Justin et al. |
| 2006/0009854 | A1 | 1/2006 | Justin et al. |
| 2007/0055269 | A1 | 3/2007 | Iannarone et al. |
| 2008/0058945 | A1 | 3/2008 | Hajaj et al. |
| 2010/0016978 | A1 | 1/2010 | Williams et al. |
| 2011/0029091 | A1* | 2/2011 | Bojarski ............... A61F 2/389 606/86 R |
| 2011/0218635 | A1* | 9/2011 | Amis .................... A61F 2/3868 623/20.18 |
| 2012/0245699 | A1 | 9/2012 | Lang et al. |
| 2012/0303122 | A1 | 11/2012 | Servidio |
| 2012/0330429 | A1* | 12/2012 | Axelson, Jr. ............ A61F 2/461 901/41 |
| 2013/0079669 | A1 | 3/2013 | Stein et al. |
| 2014/0316527 | A1 | 10/2014 | McShane et al. |
| 2015/0032215 | A1 | 1/2015 | Slamin et al. |
| 2019/0029834 | A1 | 1/2019 | Elsner et al. |

FOREIGN PATENT DOCUMENTS

| | | |
|---|---|---|
| JP | 2009529956 A | 8/2009 |
| JP | 2011526502 A | 10/2011 |
| JP | 2012531265 A | 12/2012 |
| JP | 2014531920 A | 12/2014 |
| JP | 2018502651 A | 2/2018 |

OTHER PUBLICATIONS

PCT International Search Report for International Application No. PCT/IB20/54100, dated Aug. 11, 2020; 3 pages.
Supplementary European search report, European Patent Application No. 20798480.8-1122, dated Dec. 13, 2022, 6 pages.
Office Action issued Jan. 9, 2024 in co-pending Japanese application No. JP2021-564777, 10 pages.

* cited by examiner

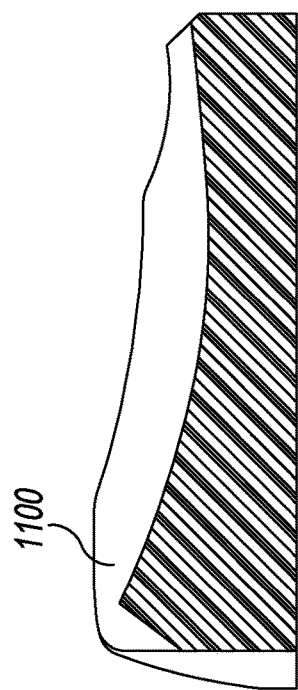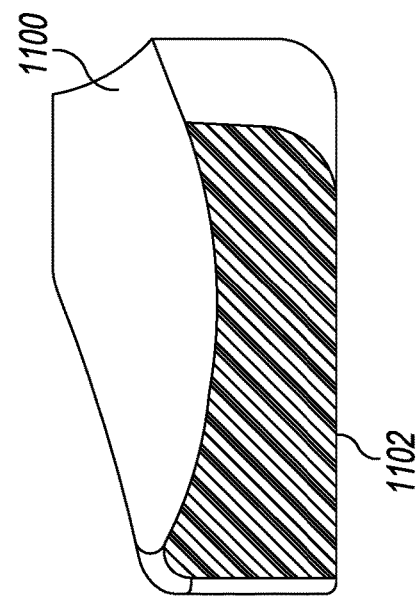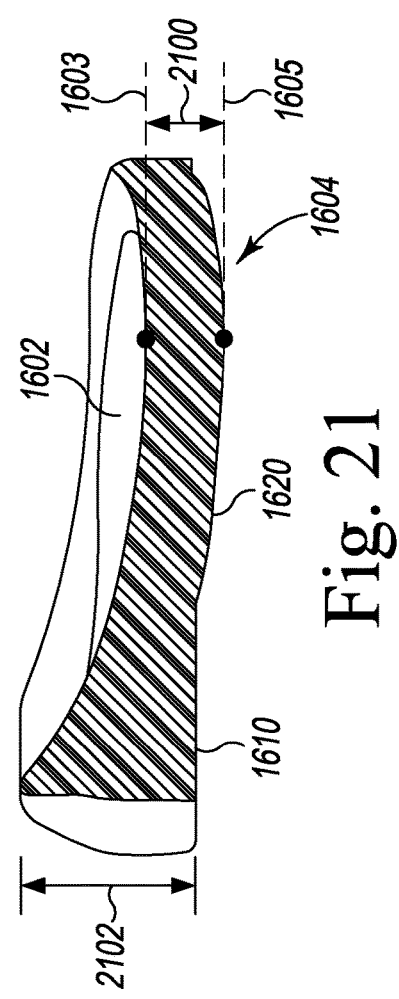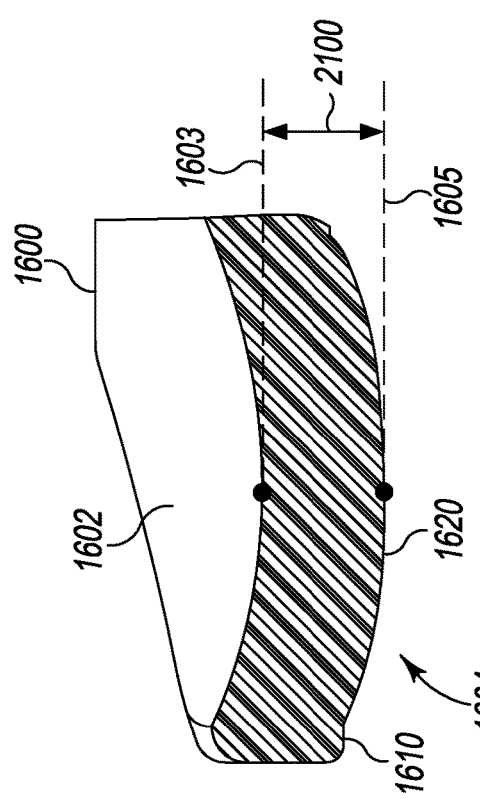
Fig. 21
Fig. 22 (Prior Art)
Fig. 23
Fig. 24 (Prior Art)

ORTHOPAEDIC IMPLANT SYSTEM WITH BONE CONSERVING FEATURES

CROSS-REFERENCE TO RELATED APPLICATIONS

The present patent application claims priority to and the benefit of U.S. Provisional Patent Application Ser. No. 62/842,178 entitled "ORTHOPAEDIC IMPLANT SYSTEM WITH BONE CONSERVING FEATURES," which was filed on May 2, 2019 and which is expressly incorporated by reference in its entirety into this application.

TECHNICAL FIELD

The present invention relates to orthopaedic systems, and, more particularly, to orthopaedic systems for performing knee replacement surgery.

BACKGROUND

Joint arthroplasty is a well-known surgical procedure by which a diseased and/or damaged natural joint is replaced by a prosthetic joint. A typical knee prosthesis includes a tibial tray, a femoral component, and a polymer insert or bearing positioned between the tibial tray and the femoral component. Depending on the severity of the damage to the patient's joint, orthopaedic prostheses of varying mobility may be used. For example, the knee prosthesis may include a "fixed" tibial insert in cases wherein it is desirable to limit the movement of the knee prosthesis, such as when significant soft tissue damage or loss is present. Alternatively, the knee prosthesis may include a "mobile" tibial insert in cases wherein a greater degree of freedom of movement is desired.

The type of orthopaedic knee prosthesis used to replace a patient's natural knee may also depend on whether the patient's posterior cruciate ligament is retained or sacrificed (i.e., removed) during surgery. For example, if the patient's posterior cruciate ligament is damaged, diseased, and/or otherwise removed during surgery, a posterior-stabilized knee prosthesis may be used to provide additional support and/or control at later degrees of flexion. Alternatively, if the posterior cruciate ligament is intact, a cruciate-retaining knee prosthesis may be used.

Additionally, depending on the condition of the patient's knee joint, the orthopaedic knee prosthesis may be a total knee prosthesis designed to replace the femoral-tibial interface of both condyles of the patient's femur or a uni-compartmental (or uni-condylar) knee prosthesis designed to replace the femoral-tibial interface of a single condyle of the patient's femur. Total knee replacement or arthroplasty may involve replacement of the mid-shaft portion of the femur, proximal, distal, and/or total femur, and proximal tibia. Uni-compartmental knee replacement or arthroplasty involves uni-condylar resurfacing. Uni-compartmental knee arthroplasty provides an alternative to total knee arthroplasty for rehabilitating knees when only one condyle has been damaged as a result of trauma or disease such as non-inflammatory degenerate joint disease or its composite diagnosis of osteoarthritis or post-traumatic arthritis. In some cases, the orthopaedic knee prosthesis may be a bi-compartmental knee prosthesis formed by two uni-compartmental knee prostheses, which replace each of the medial and lateral tibial condyles of the patient. In such cases, a single, total femoral component or two partial femoral components may be used to cooperate with the two uni-compartment inserts.

SUMMARY

According to an aspect of the present disclosure, a uni-compartmental tibial insert includes an anterior end, a posterior end, an articular surface extending from the anterior end to the posterior end, and a bottom surface, opposite the articular surface, extending from the anterior end to the posterior end. The articular surface is configured to articulate with a corresponding condyle of a natural or prosthetic femur. The bottom surface is configured to couple with a uni-compartmental tibial tray and is non-planar.

In some embodiments, the articular surface has a concave shape when viewed in a sagittal plane, and the bottom surface has a convex shape when viewed in the sagittal plane. Additionally or alternatively, the articular surface may have a concave shape when viewed in a coronal plane, and the bottom surface may have a convex shape when viewed in the coronal plane.

A perpendicular distance between the articular surface and the bottom surface may define a thickness of the tibial insert. In some embodiments, the thickness of the tibial insert is constant between the anterior end and the posterior end. For example, the thickness of the tibial insert is about six millimeters. Additionally, in some embodiments, wherein the curvature of the articular surface matches the curvature of the bottom surface.

According to another aspect of the present disclosure, a uni-compartmental tibial insert includes an anterior end, a posterior end, an articular surface extending from the anterior end to the posterior end, and a bottom surface, opposite the articular surface, extending from the anterior end to the posterior end. The articular surface is configured to articulate with a corresponding condyle of a natural or prosthetic femur. The bottom surface is configured to couple with a uni-compartmental tibial tray and is non-planar. A perpendicular distance between the articular surface and the bottom surface may define a thickness of the tibial insert that is constant between the anterior end and the posterior end.

According to an additional aspect of the present disclosure, a uni-compartmental tibial insert may include an anterior end, a posterior end, an articular surface extending from the anterior end to the posterior end, and a bottom surface, opposite the articular surface, extending from the anterior end to the posterior end. The articular surface is configured to articulate with a corresponding condyle of a natural or prosthetic femur. The bottom surface is configured to couple with a uni-compartmental tibial tray and includes a planar base surface and a protrusion extending from the planar base surface. The protrusion has a curved outer surface.

In some embodiments, the articular surface may have a concave shape when viewed in a sagittal plane, and the protrusion of the bottom surface may have a convex shape when viewed in the sagittal plane. Additionally or alternatively, the articular surface may have a concave shape when viewed in a coronal plane, and the protrusion of the bottom surface may have a convex shape when viewed in the coronal plane.

A perpendicular distance between the articular surface and the bottom surface may define a thickness of the tibial insert. In such embodiments, the thickness of the tibial insert may be constant between the anterior end and the posterior end. For example, the thickness of the tibial insert is about six millimeters.

In some embodiments, a first perpendicular distance between the articular surface and the planar base surface of the bottom surface defines a first thickness, and a second perpendicular distance between the articular surface and the curved outer surface of the protrusion defines a second perpendicular distance. The second perpendicular distant may be equal to the first perpendicular distance.

Additionally, in some embodiments, a perpendicular distance between the articular surface and the curved outer surface of the protrusion of the bottom surface may define a thickness of the protrusion. The thickness of the protrusion may be constant in some embodiments. For example, the thickness of the protrusion may be about six millimeters. Additionally, in some embodiments, the protrusion of the bottom surface may be hemi-ellipsoidal in shape. Further, in some embodiments, the protrusion of the bottom surface is offset from a medial-to-lateral axis of the tibial insert toward the posterior end of the tibial insert.

According to yet another aspect of the present disclosure, a tibial knee prosthesis may include an anterior side, a posterior side, a medial articular surface extending from the anterior side to the posterior side, a lateral articular surface extending from the anterior side to the posterior side, and a bottom surface, opposite the medial and lateral articular surfaces, extending from the anterior side to the posterior side. The medial articular surface may be configured to articulate with a medial condyle of a natural or prosthetic femur. Similarly, the lateral articular surface may be configured to articulate with a lateral condyle of the natural or prosthetic femur. The bottom surface includes a planar base surface and a protrusion extending from the planar base surface below the medial articular surface or the lateral surface. The protrusion may have a curved outer surface.

In some embodiments, the tibial insert may further includes a peg extending from the protrusion of the bottom surface. Additionally, in some embodiments, each of the medial articular surface and the lateral articular surface may have a concave shape when viewed in a sagittal plane. In such embodiments, the protrusion of the bottom surface may have a convex shape when viewed in the sagittal plane.

In some embodiments, a perpendicular distance between the medial articular surface and the curved outer surface of the protrusion or between the lateral articular surface and the curved outer surface of the protrusion defines a thickness of the protrusion. In such embodiments, the thickness of the protrusion may be constant and about six millimeters.

In some embodiments, the tibial insert may be embodied as a monoblock prosthesis and include a polymer bearing attached to a metallic platform. In such embodiments, the polymer bearing includes the medial and lateral articular surfaces, and the metallic platform includes the bottom surface having the planar base surface and the protrusion extending from the planar base surface below the medial articular surface or the lateral articular surface.

BRIEF DESCRIPTION OF THE DRAWINGS

The detailed description particularly refers to the following figures, in which:

FIG. 21 is an anterior-to-posterior cross-sectional view of the uni-compartmental tibial insert of FIG. 16;

FIG. 22 is an anterior-to-posterior cross-sectional view of a typical tibial insert similar to FIG. 10;

FIG. 23 is a medial-to-lateral cross-sectional view of the uni-compartmental tibial insert of FIG. 16;

FIG. 24 is a medial-to-lateral cross-sectional view of the typical tribal insert of FIG. 22;

DETAILED DESCRIPTION OF THE DRAWINGS

Figure 1:
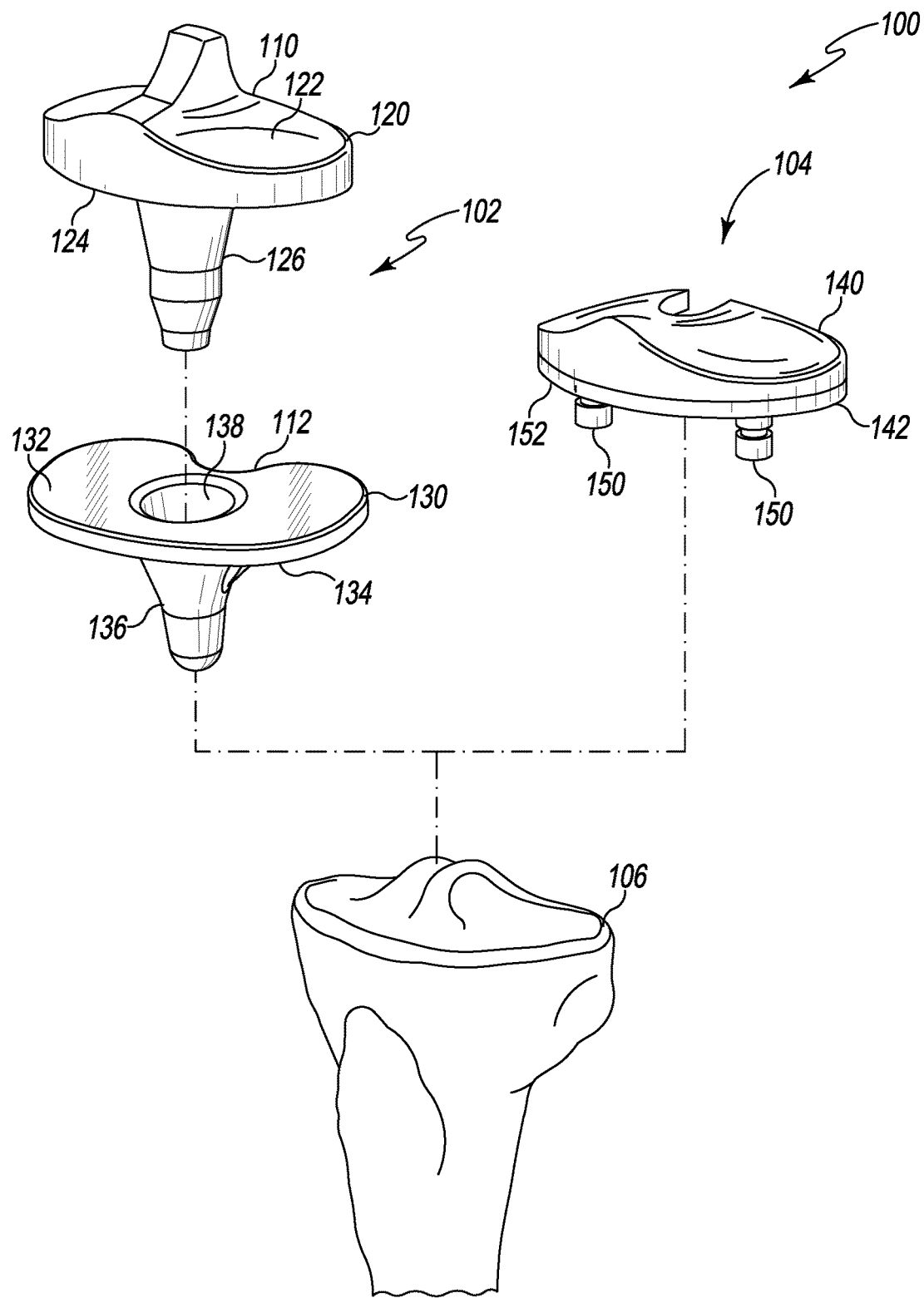
FIG. 1 is an exploded perspective view of an embodiment of a typical orthopaedic knee prosthesis system for implantation into a tibia of a patient.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Terms representing anatomical references, such as anterior, posterior, medial, lateral, superior, inferior, etcetera, may be used throughout the specification in reference to the orthopaedic implants and surgical instruments described herein as well as in reference to the patient's natural anatomy. Such terms have well-understood meanings in both the study of anatomy and the field of orthopaedics. Use of such anatomical reference terms in the written description and claims is intended to be consistent with their well-understood meanings unless noted otherwise.

Referring now to FIG. 1, an illustrative orthopaedic total knee prosthesis system 100 includes a typical "mobile" or "rotating" orthopaedic knee prosthesis 102 and a typical "fixed" orthopaedic knee prosthesis 104. Each of the orthopaedic knee prosthesis 102 and the orthopaedic knee prosthesis 104 is configured to be secured to a surgically-prepared proximal end of a patient's tibia 106 as discussed in more detail below.

The illustrative "mobile" orthopaedic knee prosthesis 102 includes a tibial insert 110 and a tibial tray 112. The tibial insert 110 is typically formed from a polymer material such as an ultra-high molecular weight polyethylene (UHMWPE), while the tibial tray 112 is formed from a metallic material such as cobalt-chromium or titanium.

The tibial insert 110 is configured to be coupled with the tibial tray 112 and includes a platform 120 having an upper bearing surface 122 and a bottom surface 124. To facilitate the coupling of the tibial insert 110 and the tibial tray 112, the tibial insert 110 also includes a stem 126 that extends downwardly from the bottom surface 124 of the platform 120. The stem 126 is configured to be received in a bore 138 of the tibial tray 112. In use, the tibial insert 110 is configured to rotate about an axis defined by the stem 126 relative to the tibial tray 112.

Figure 2:
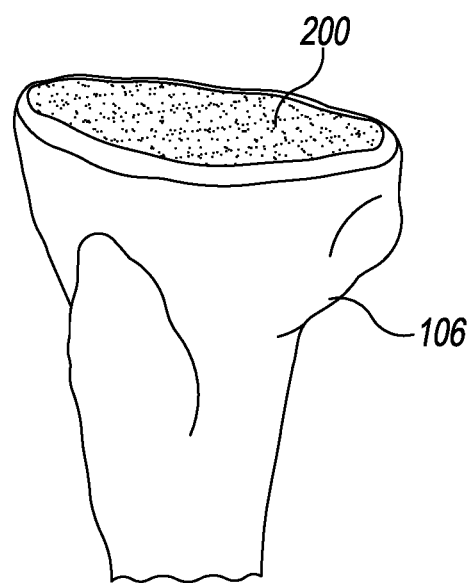
FIG. 2 is a perspective view of the tibia of FIG. 1 subsequent to a total knee prosthesis resection.

As discussed below in regard to FIG. 2, the tibial tray 112 is configured to be secured to the surgically-prepared proximal end of the patient's tibia 106. The tibial tray 112 may be secured to the patient's tibia via use of bone adhesive or other attachment means. The tibial tray 112 includes a platform 130 having a top surface 132 and a bottom surface 134. The tibial tray 112 also includes a stem 136 extending downwardly from the bottom surface 134 of the platform 130. The bore 138 is defined in the top surface 132 of the platform 130 and extends downwardly into the stem 126.

The illustrative "fixed" orthopaedic knee prosthesis 104 includes a tibial insert or bearing 140 attached to a tibial platform or base 142. The tibial insert 140 is typically formed from a polymer material such as an ultra-high molecular weight polyethylene (UHMWPE), while the tibial platform 142 is formed from a metallic material such as cobalt-chromium or titanium. The orthopaedic knee prosthesis 104 may also include one or more pegs or keels 150 extending downwardly from a bottom surface 152 of the tibial platform 142 to facilitate securement to the patient's tibia 106.

The tibial insert 140 and the tibial platform 142 may be of modular design (e.g., the tibial insert 140 and tibial platform 142 may be separate components) or unitary design. For example, in some embodiments, the tibial insert 140 may be permanently attached (e.g., molded to) the tibial platform 142. Regardless, similar to the tibial tray 112, the tibial platform 142 is configured to be secured to the surgically prepared proximal end of the patient's tibia 106.

As discussed above, either of the orthopaedic knee prosthesis 102 or the orthopaedic knee prosthesis 104 may be used in a total knee arthroplasty (TKA) to replace the proximal end of the patient's tibia 106. To do so, the patient's tibia 106 is resected via a planar cut across the tibial plateau to produce a planar resected surface 200 at the proximal end of the patient's tibia 106 as shown in FIG. 2. The planar resected surface 200 provides a base on which the bottom surface 134 of the platform 130 of tibial tray 112 bears or on which the bottom surface 152 of the tibial platform 142 bears, depending on which orthopaedic knee prosthesis 102, 104 is used. In either case, the tibial inserts 110, 140 provide an artificial tibial articular surface on which the patient's natural or prosthetic femur may articulate. Of course, additional surgical procedures (e.g., boring of the tibia 106) may be required to fully implant the orthopaedic knee prosthesis 102, 104.

Figure 3:
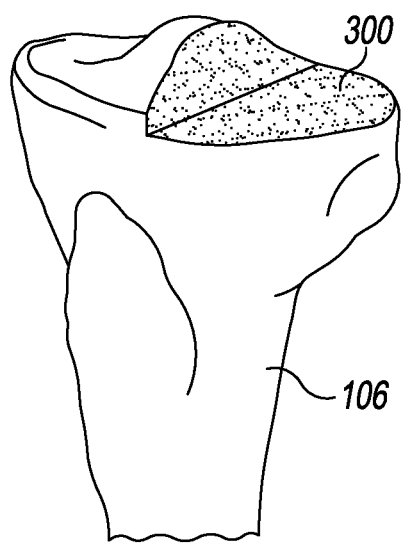
FIG. 3 is a perspective view of the tibia of FIG. 2 subsequent to a uni-compartmental knee prosthesis resection.

In some cases, a total knee arthroplasty may not be necessary as only one condyle of the patient's tibia and/or femur may be diseased or damaged. In such cases, an orthopaedic uni-compartmental knee prosthesis may be used to replace the natural condyle of the patient's tibia 106 and/or femur. A typical uni-compartmental knee prosthesis is similar to half of a total knee prosthesis, but is configured to replace a single condyle or articular surface. As such, a typical uni-compartmental tibial prosthesis includes a tibial insert having a singular articular surface and a tibial tray configured to be secured to the patient's tibia 106. A uni-compartmental knee arthroplasty (UKA) surgical procedure may be used to implant the typical uni-compartmental tibial prosthesis. To do so, one of the articular surface's of the patient's tibia 106 is resected via a planar cut across the tibial plateau to produce a planar resected surface 300 on the medial or lateral side at the proximal end of the patient's tibia 106 as shown in FIG. 3. Similar to the planar resected surface 200 discussed above in regard to FIG. 2, the planar resected surface 300 provides a base on which a bottom surface of the platform of the typical uni-compartmental tibial prosthesis bears. Of course, if a bi-compartmental knee prosthesis is used, both the medial and lateral sides of the proximal end of the patient's tibia 106 may be resected.

Figure 4:
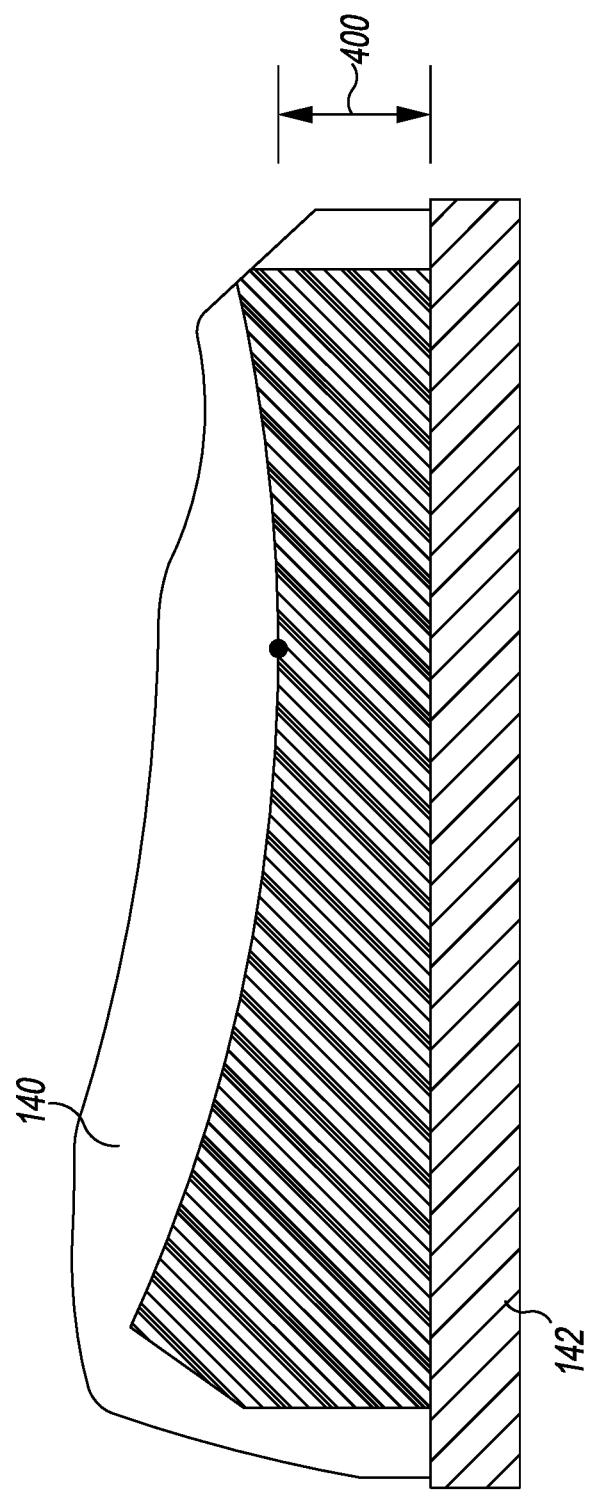
FIG. 4 is a medial-to-lateral cross-sectional view of a typical tibial insert, which may form a component of the typical orthopaedic knee prosthesis system of FIG. 1.
Figure 5:
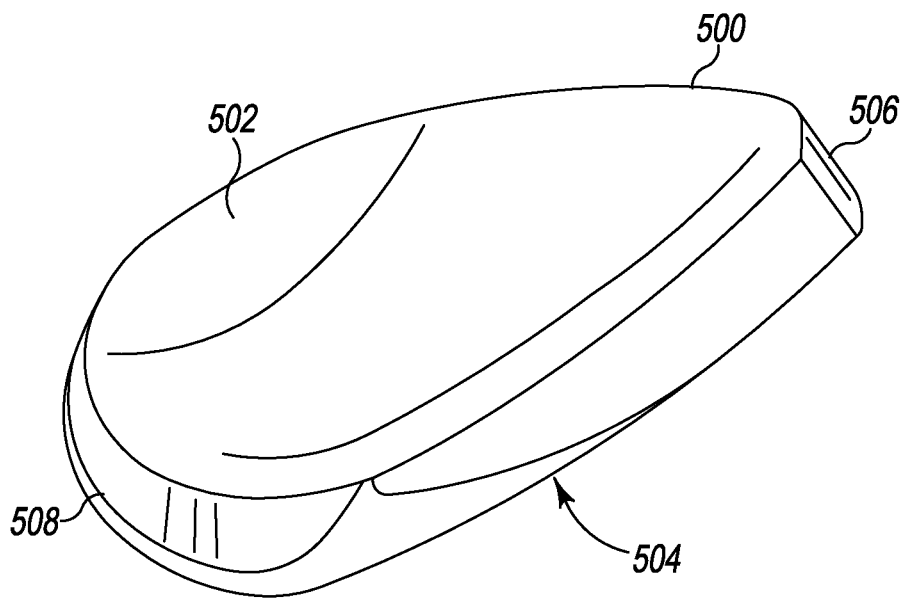
FIG. 5 is a superior perspective view of an embodiment of a uni-compartmental tibial insert having bone-conserving features.

One criteria commonly recommended and observed in orthopaedic tibial prostheses is a minimum distance between the articular surface of the tibial insert and the top surface of the tibial tray. As discussed above, the tibial insert is commonly formed from a polymer material, while the tibial tray is metal. As such, a minimum thickness of the polymer tibial insert should be maintained to ensure the tibial insert does not facture or overly wear during use. For example, as shown in FIG. 4, a minimum distance 400 of six to eight millimeters between the articular surface of the tibial insert 140 and the top surface of the tibial platform 142 (i.e., the thickness of the tibial insert) may be observed. However, maintaining the minimum tibial insert thickness, especially at the dwell point of the articular surface of the tibial insert, can result in the requirement of the removal of excess bone from the patient's tibia. That is, due to the curvature of the articular surface of the typical tibial insert, the patient's tibia 106 must be resected a distance equal to the minimum distance (e.g., 6-8 millimeters) beyond the dwell point of the articular surface, which can result is excess bone being resected in those areas that are anterior and posterior to the dwell point of the articular surface, at which the articular surface is not as deep as the dwell point.

Additionally, in some circumstances, the planar resectioning of the patient's tibia 106 can result in a "teeter totter" loading effect of the tibial knee prosthesis in which the compressive loading on one side of the tibial knee prosthesis can cause lift off the opposite side. Additionally, flexion and extension of an artificial knee can transmit shear forces across the articular surfaces of the orthopaedic prostheses of the artificial knee. Because a planar surface has a reduced resistance to shear forces, pegs or keels may be required on the orthopaedic tibial prosthesis to resist such shear forces, which require additional bone removal.

Figures 6, 7:
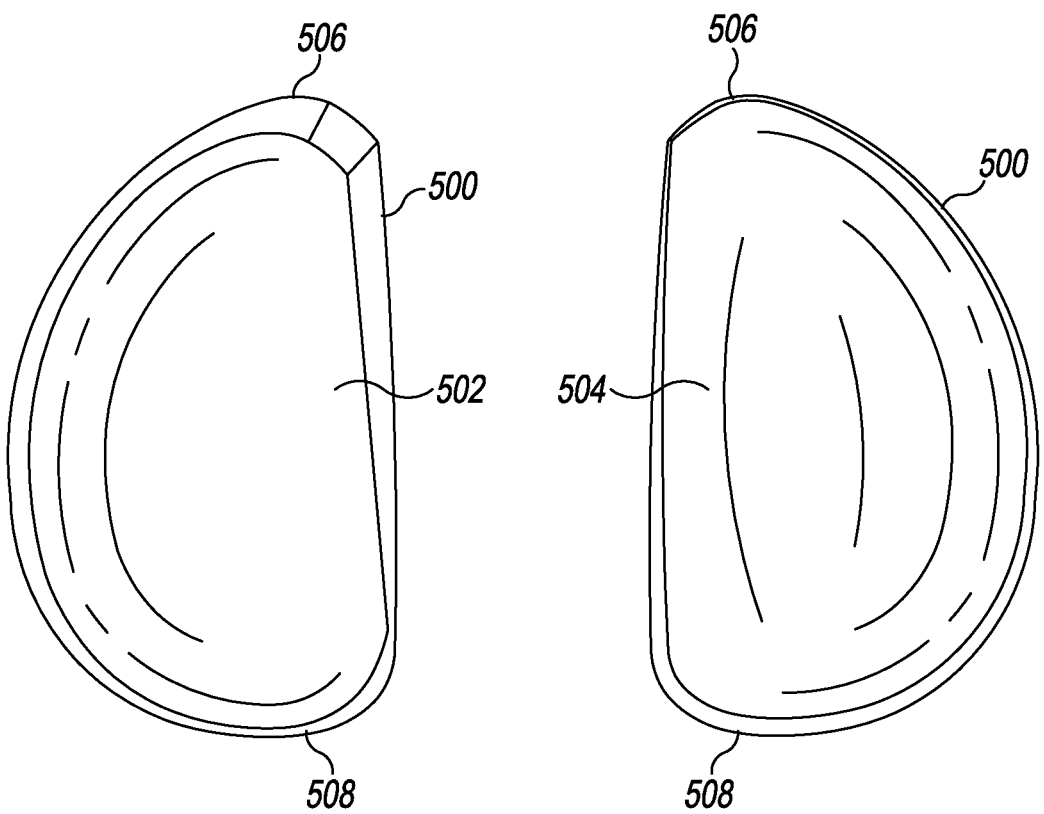
FIG. 6 is a superior plan view of the uni-compartmental tibial insert of FIG. 5.
FIG. 7 is an inferior plan view of the uni-compartmental tibial insert of FIG. 5.

Referring now to FIGS. 5-9, an illustrative uni-compartmental tibial insert 500 includes bone-conserving features to reduce the amount of bone removed during implantation of the tibial insert 500 into a tibia of a patient. The uni-compartmental tibial insert 500 is generally "D-shaped" when viewed in a plan view as shown in FIGS. 6 and 7 and includes an articular surface 502 and a bottom surface 504 opposite the articular surface 502. The articular surface 502, which extends from an anterior end 506 to a posterior end 508 of the tibial insert 500, is curved and configured to articulate with a corresponding natural or prosthetic condyle of the patient's femur. Additionally, unlike typical uni-compartmental tibial inserts, the bottom surface 504 is also curved and extends from the anterior end 506 to the posterior end 508 of the tibial insert 500.

Figure 8:
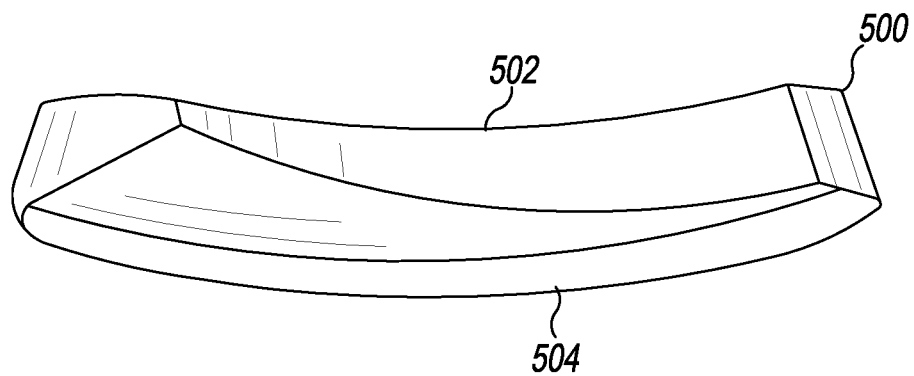
FIG. 8 is a medial elevation view of the uni-compartmental tibial insert of FIG. 5.
Figure 9:
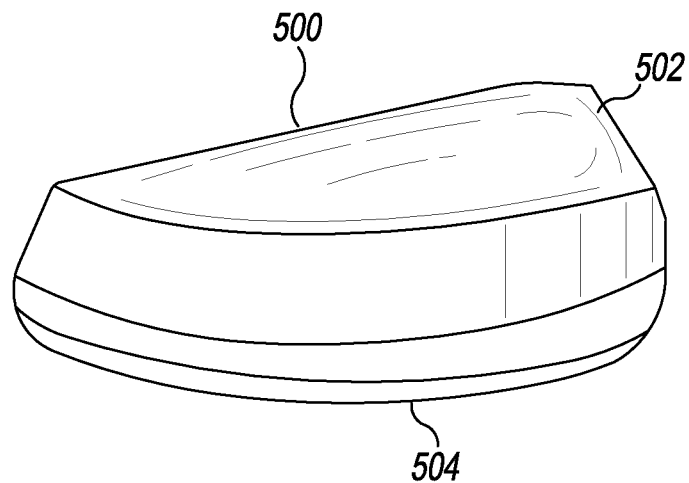
FIG. 9 is a posterior elevation view of the uni-compartmental tibial insert of FIG. 5.

Illustratively, the articular surface 502 has a concave curvature, and the bottom surface 504 has a convex curvature such that the bottom surface 504 mirrors the curvature of the articular surface 502. For example, as shown in FIG. 8, the articular surface 502 has is concave in the anterior-posterior direction when viewed in the sagittal plane, and the bottom surface 504 is convex in the anterior-posterior direction when viewed in the sagittal plane. Similarly, as shown in FIG. 9, the articular surface 502 is concave in the medial-lateral direction when viewed in the coronal plane, and the bottom surface 504 is convex in the medial-lateral direction when viewed in the coronal plane.

Figure 10:
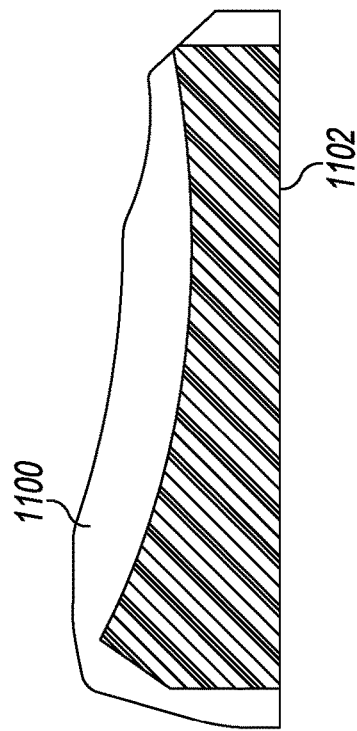
FIG. 10 is an anterior-to-posterior cross-sectional view of the uni-compartmental tibial insert of FIG. 5.
Figure 11:
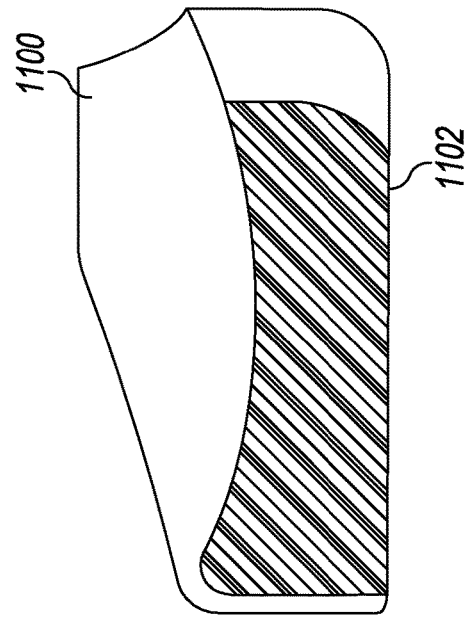
FIG. 11 is an anterior-to-posterior cross-sectional view of a typical tibial insert similar to FIG. 4.
Figure 12:
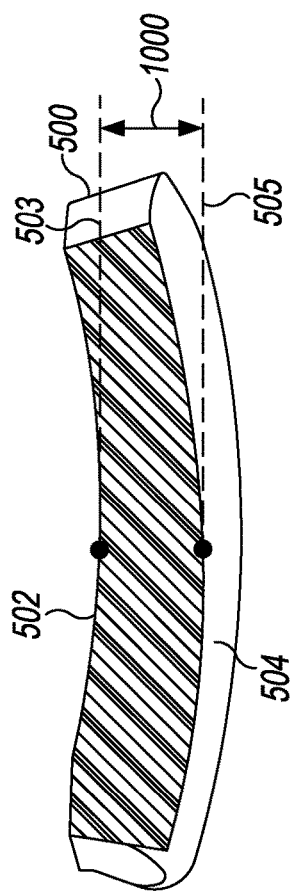
FIG. 12 is a medial-to-lateral cross-sectional view of the uni-compartmental tibial insert of FIG. 5.

Referring now to FIGS. 10-13, in some embodiments, the curvature of the bottom surface 504 matches the curvature of the articular surface 502 such that the thickness of the uni-compartmental tibial insert 500 is constant within manufacturing tolerances. For example, in the illustrative embodiment, a perpendicular distance 1000 defined between the articular surface 502 and the bottom surface 504 defines a thickness of the uni-compartmental tibial insert 500, which is constant in the anterior-posterior direction as shown in FIG. 10, as well as the medial-lateral direction as shown in FIG. 12.

As shown in FIGS. 10 and 12, the perpendicular distance 1000 is defined by the length of an imaginary line (distance 1000) that is perpendicular to an imaginary tangent line 503 that is tangent to the articular surface 502 and perpendicular to an imaginary tangent line 505 that is tangent to the bottom surface 504. For example, the perpendicular distance 1000 can be measured as the distance between the point of contact of the imaginary tangent line 503 with the articular surface 502 and the point of contact of the imaginary tangent line 505 with the bottom surface 504.

Figure 13:
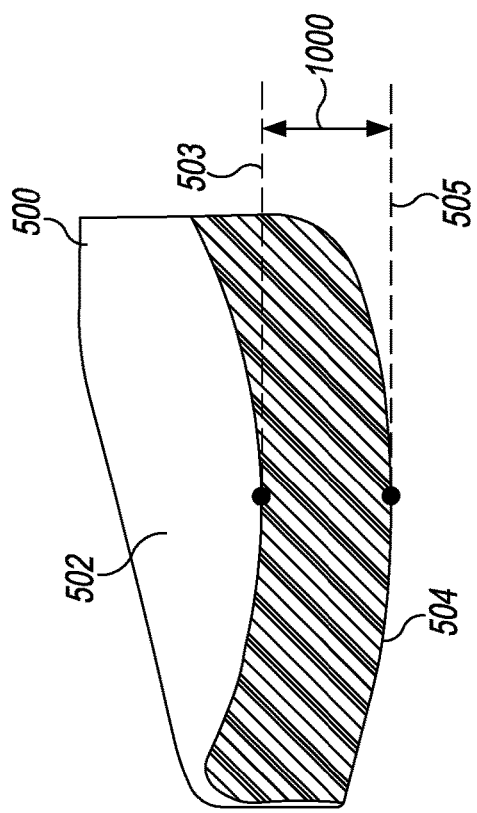
FIG. 13 is a medial-to-lateral cross-sectional view of the typical tribal insert of FIG. 11.

Conversely, as shown in FIGS. 11 and 12, a typical uni-compartmental tibial insert 1100 has a flat bottom surface 1102, which causes the thickness of the typical uni-compartmental tibial insert 1100 to vary in both the anterior-posterior direction as shown in FIG. 11, as well as the medial-lateral direction as shown in FIG. 13. As such, the typical uni-compartmental tibial insert 1100 requires additional bone of the patient's tibia to be removed in the peripheral anterior, posterior, medial, and lateral areas (i.e., the areas distant from the dwell point).

Figure 14:
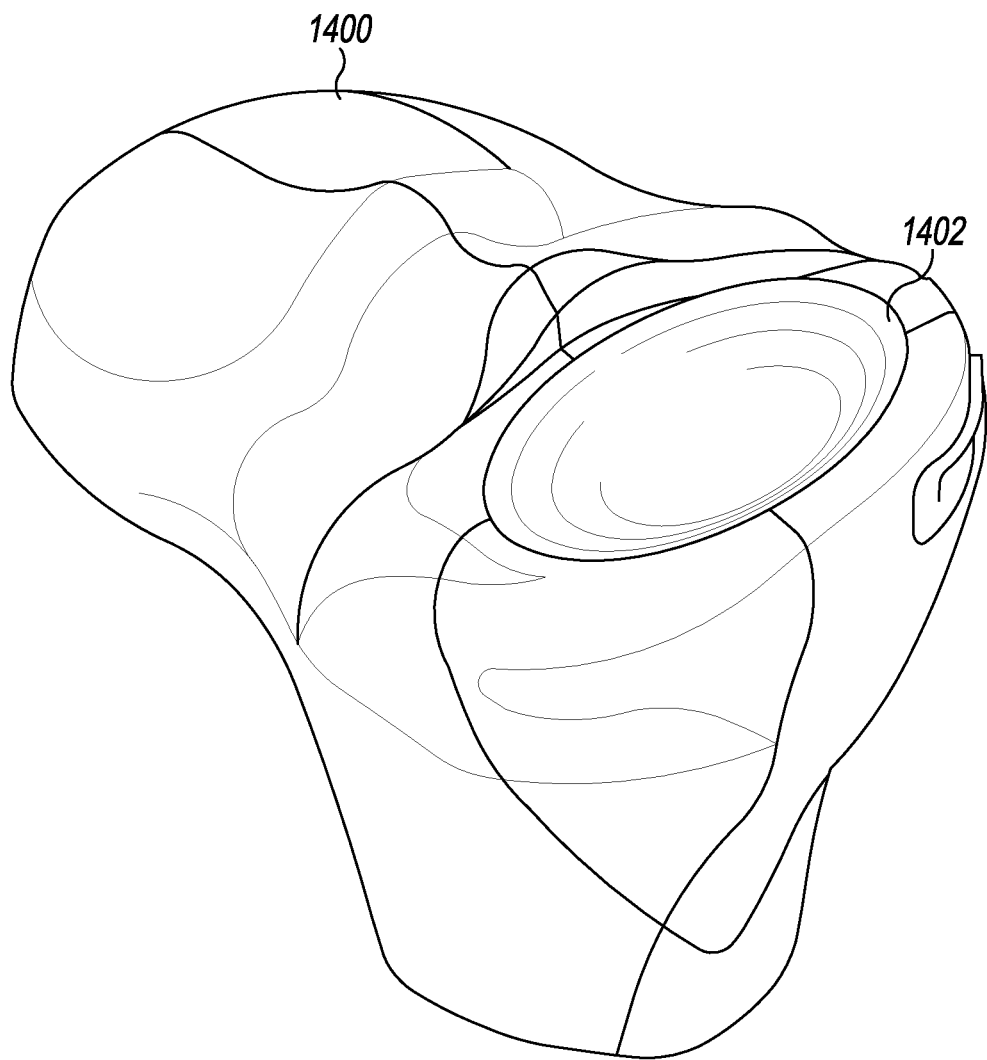
FIG. 14 is a perspective view of a tibia of a patient subsequent to a uni-compartmental tibial insert resection in preparation for implantation of the uni-compartmental tibial insert of FIG. 5.
Figure 15:
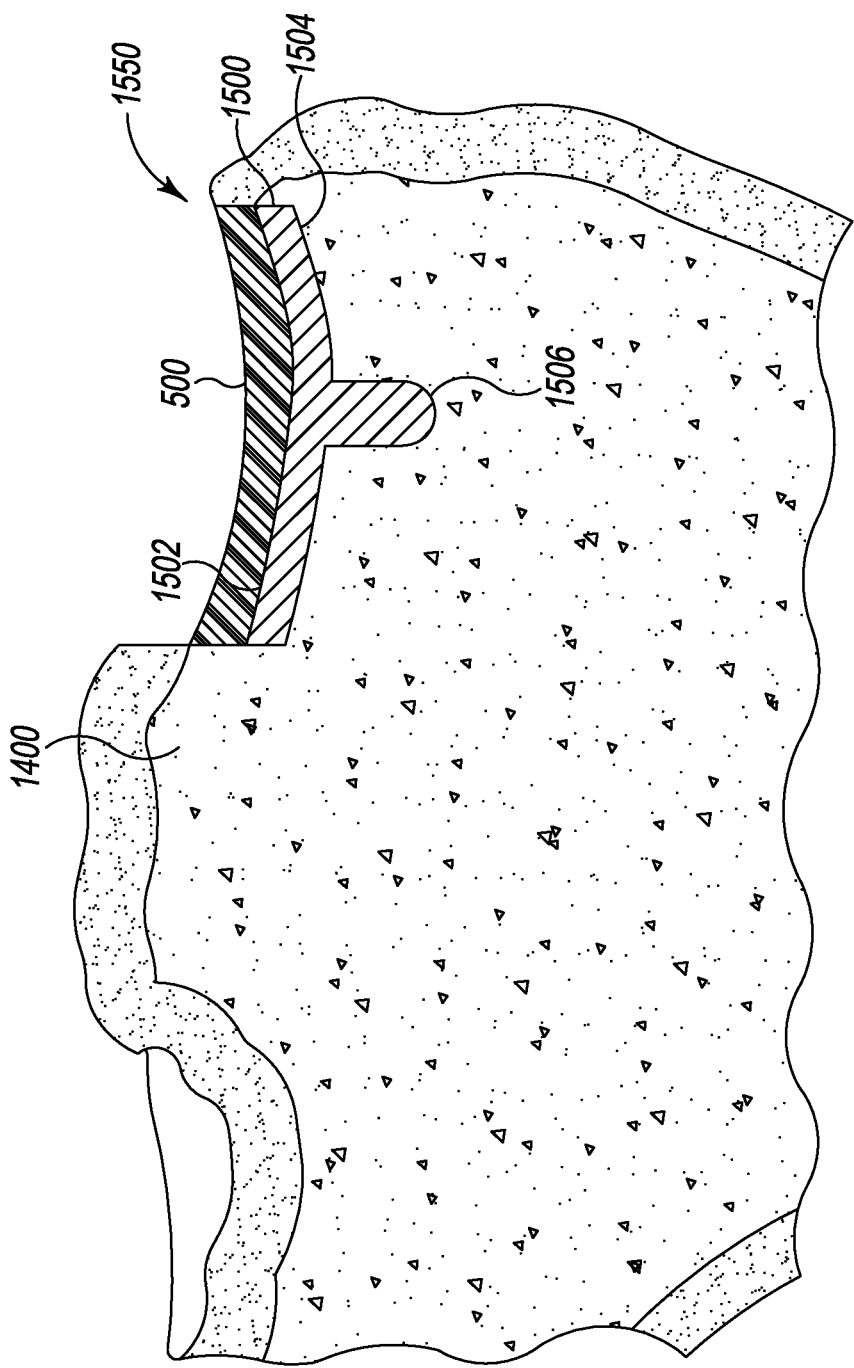
FIG. 15 is a cross-sectional evaluation view of the patient's tibia of FIG. 14 subsequent to the implantation of a uni-compartmental knee prosthesis including the uni-compartmental tibial insert of FIG. 5.
Figure 16:
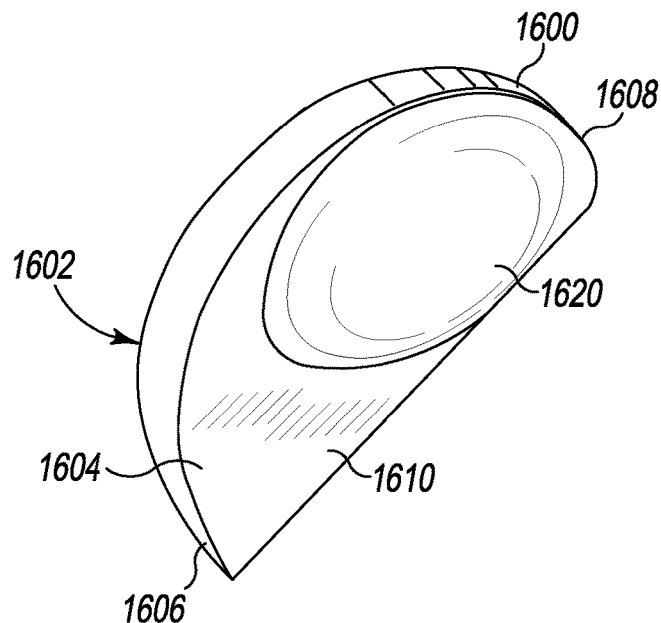
FIG. 16 is an inferior perspective view of another embodiment a uni-compartmental tibial insert having bone-conserving features.

Referring now to FIGS. 14 and 15, it should be appreciated that the uni-compartmental tibial insert 500 may include, or otherwise be configured to mate with, a uni-compartmental tibial tray 1500 to form a uni-compartmental tibial prosthesis 1550. In some embodiments, the uni-compartmental tibial tray 1500 may include a tibial platform 1502 having a curved top surface 1504 formed to couple with the uni-compartmental tibial insert 500 and a bottom surface 1506, which is curved similar to, or otherwise matching, the curvature of the bottom surface 504 of the uni-compartmental tibial insert 500 to reduce the amount of bone removed during implantation. As such, as shown in FIG. 14, the uni-compartmental tibial prosthesis 1550 can be implanted into a rounded or hemi-ellipsoidal recess 1402 bored or otherwise formed in the proximal end of a patient's tibia 1400 without the requirement of a planar cut of the patient's tibia 1400 as shown. Because of the curved bottom surfaces 504, 1506, the recess 1402 may be formed to have the minimum depth required to ensure the minimum distance between the articular surface 502 of the uni-compartmental tibial insert 500 and the top surface 1504 of the tibial tray 1500. In this way, the bone of the patient's tibia 1400 is conserved relative to a planar resection of the patient's tibia. Additionally, it should be appreciated that the oval shape of the recess 1402 can provide improved resistance to shear forces, which may reduce or eliminate the requirement of pegs or keels on the tibial tray 1500 and further conserve the bone of the patient's tibia 1400.

Figure 17:
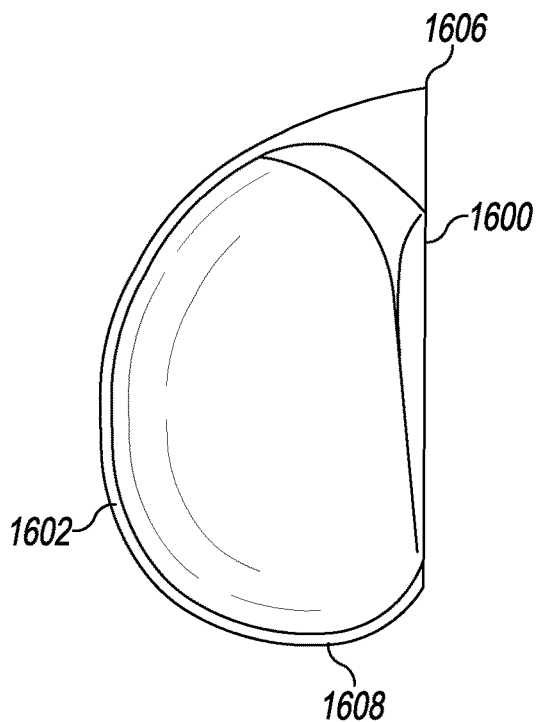
FIG. 17 is a superior plan view of the uni-compartmental tibial insert of FIG. 16.
Figure 18:
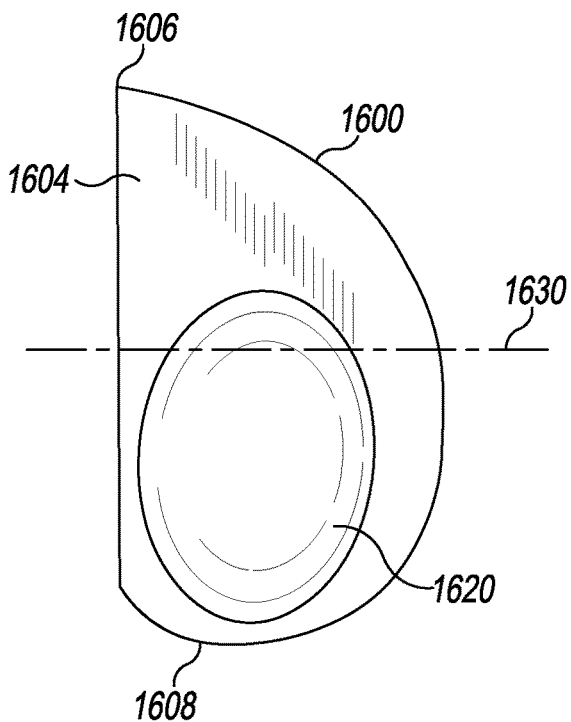
FIG. 18 is an inferior plan view of the uni-compartmental tibial insert of FIG. 16.

Referring now to FIGS. 16-20, another illustrative uni-compartmental tibial insert 1600 includes bone-conserving features to reduce the amount of bone removed during implantation of the tibial insert 1600 into a tibia of a patient. The uni-compartmental tibial insert 1600 is similar to the uni-compartmental tibial insert 500 described above and is generally "D-shaped" when viewed in a plan view as shown in FIGS. 17 and 18. The uni-compartmental tibial insert 1600 includes an articular surface 1602 and a bottom surface 1604 opposite the articular surface 1602. Similar to the uni-compartmental tibial insert 500, the articular surface 1602, which extends from an anterior end 1606 to a posterior end 1608 of the tibial insert 1600, is curved and configured to articulate with a corresponding natural or prosthetic condyle of the patient's femur. However, the bottom surface 1604 of the uni-compartmental tibial insert 1600 has a planar base surface 1610 and a protrusion 1620 that extends away from (e.g., inferiorly) the planar base surface 1610.

Figure 19:
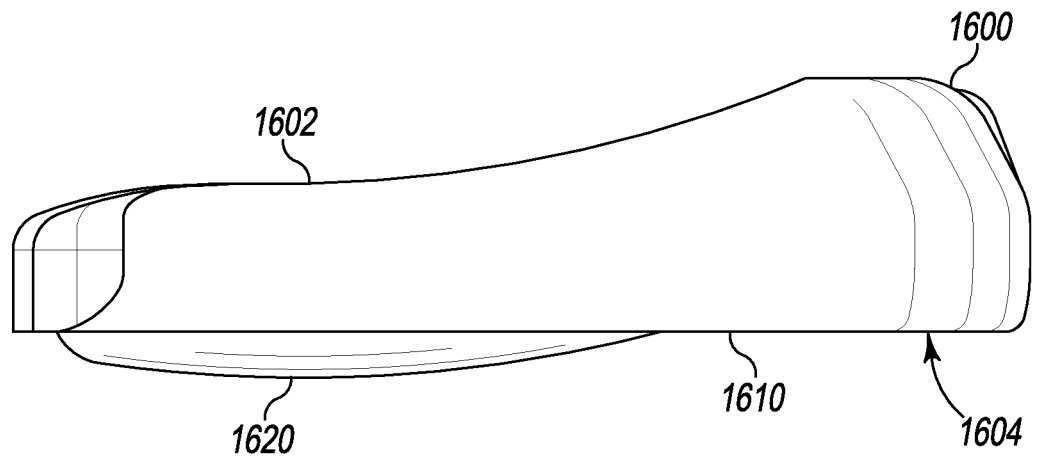
FIG. 19 is a medial elevation view of the uni-compartmental tibial insert of FIG. 16.
Figure 20:
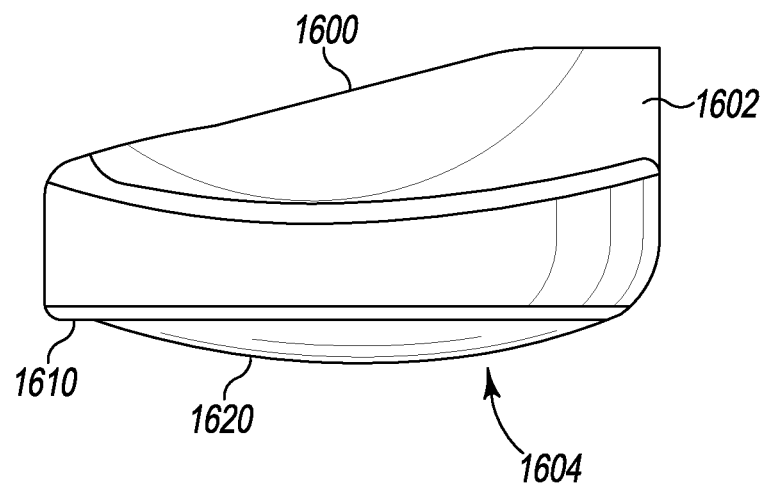
FIG. 20 is a posterior elevation view of the uni-compartmental tibial insert of FIG. 16.
Figure 25:
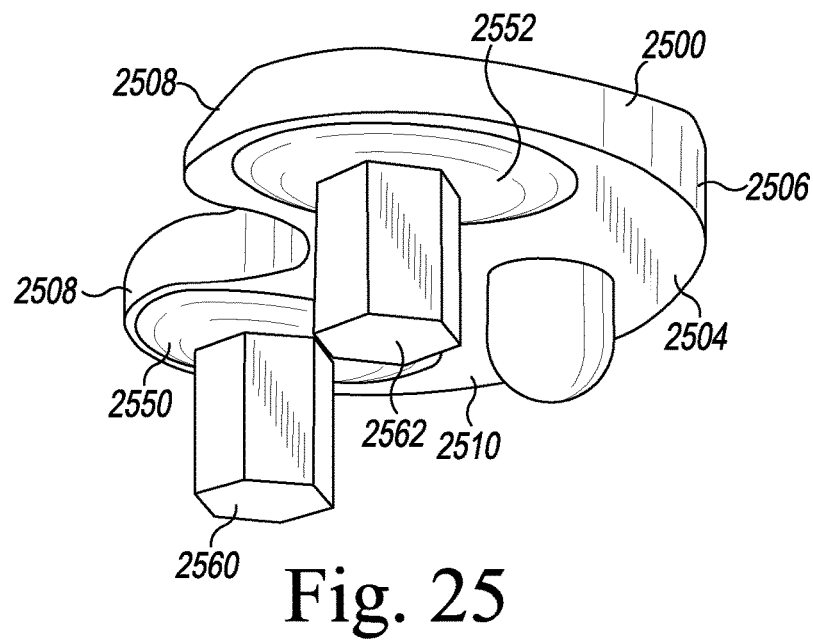
FIG. 25 is an inferior perspective view of a tibial total knee prosthesis having bone-conserving features.
Figure 26:
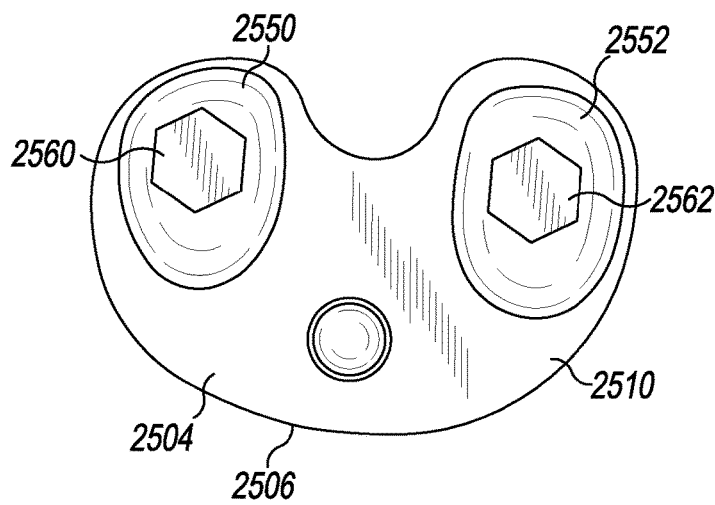
FIG. 26 is an inferior plan view of the tibial total knee prosthesis of FIG. 25.
Figure 27:
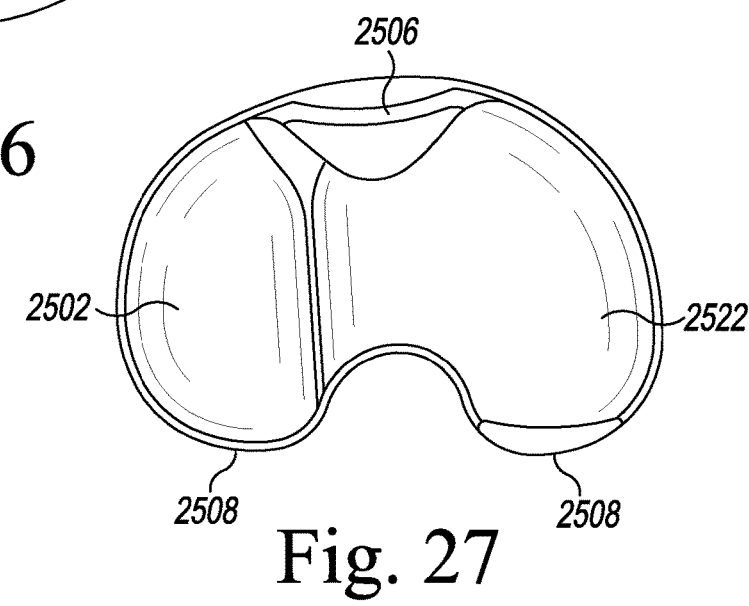
FIG. 27 is a superior plan view of the tibial total knee prosthesis of FIG. 25.

The protrusion 1620 has a curved outer surface that has a convex curvature that mirrors a concave curvature of the articular surface 1602 in the area of the protrusion 1620. For example, as shown in FIG. 19, the articular surface 1602 is concave in the anterior-posterior direction when viewed in the sagittal plane, and the curved outer surface of the protrusion 1620 is convex in the anterior-posterior direction when viewed in the sagittal plane. Similarly, as shown in FIG. 20, the articular surface 1602 has is concave in the medial-lateral direction when viewed in the coronal plane, and the curved outer surface of the protrusion 1620 is convex in the medial-lateral direction when viewed in the coronal plane.

The protrusion 1620 is illustratively hemi-ellipsoidal in shape but may have a different shape in other embodiments. The protrusion 1620 is located on the planar base surface 1610 so as to be aligned with the dwell point of the articular surface 1602 such that the thickness of the uni-compartmental tibial insert 1600 satisfies the minimum thickness (e.g., 6-8 millimeters). For example, as shown in FIG. 18, because the dwell point of the articular surface 1602 is located toward the posterior end 1608 of the uni-compartmental tibial insert 1600, the protrusion 1620 is likewise offset toward the posterior end 1608 relative to a medial-lateral axis 1630 of the uni-compartmental tibial insert 1600.

Referring now to FIGS. 21-24, in some embodiments, the curvature of the curved outer surface of the protrusion 1620 matches the curvature of the articular surface 1602 such that the thickness of the uni-compartmental tibial insert 1600 in the area of the protrusion 1620 is constant within manufacturing tolerances. For example, in the illustrative embodiment, a perpendicular distance 2100 between the articular surface 1602 and the curved outer surface of the protrusion 1620 defines a thickness of the protrusion 1620 which is constant in the anterior-posterior direction as shown in FIG. 21, as well as the medial-lateral direction as shown in FIG. 23.

As shown in FIGS. 21 and 23, the perpendicular distance 2100 is defined by the length of an imaginary line (distance 2100) that is perpendicular to an imaginary tangent line 1603 that is tangent to the articular surface 1602 and perpendicular to an imaginary tangent line 1605 that is tangent to the curved outer surface of the protrusion 1620. For example, the perpendicular distance 2100 can be measured as the distance between the point of contact of the imaginary tangent line 1603 with the articular surface 1602 and the point of contact of the imaginary tangent line 1604 with the curved outer surface of the protrusion 1620.

Conversely, as shown in FIGS. 22 and 24, the typical uni-compartmental tibial insert 1100 has a flat bottom surface 1102 which causes the thickness of the typical uni-compartmental tibial insert 1100 to vary in both the anterior-posterior direction as shown in FIG. 22, as well as the medial-lateral direction as shown in FIG. 24.

Illustratively, the overall thickness of the uni-compartmental tibial insert 1600 varies between the protrusion 1620 and the planar base surface 1610. For example, as shown in FIG. 21, a perpendicular distance 2102 between the articular surface 1602 and the planar base surface 1610 defines a thickness of the uni-compartmental tibial insert 1600, which is different from the thickness of the protrusion 1620 discussed above. However, in embodiments, the overall thickness of the uni-compartmental tibial insert 1600 may not very and may be equal to the thickness of the protrusion 1620 (i.e., the perpendicular distance 2100).

The tibial inserts 500, 1600 have been illustrated and described as uni-compartmental tibial inserts to replace a single condyle of a patient's tibia. However, it should be appreciated that, in some embodiments, a medial and a lateral uni-compartmental tibial insert 500, 1600 may be used to form a bi-compartmental tibial insert to replace both condyles of the patient's tibia.

Referring now to FIGS. 25-31, an illustrative tibial knee prosthesis 2500 includes bone-conserving features to reduce the amount of bone removed during implantation of the tibial knee prosthesis 2500 into a tibia of a patient. The tibial knee prosthesis 2500 is embodied as a total knee prosthesis configured to replace the proximal end of the patient's tibia. As such, the tibial knee prosthesis 2500 includes a medial articular surface 2502, a lateral articular surface 2522, and a bottom surface 2504 opposite the medial and lateral articular surfaces 2502, 2522. The medial articular surface 2502, which extends from an anterior end 2506 to a posterior end 2508 of the tibial knee prosthesis 2500, is curved and configured to articulate with a corresponding natural or prosthetic medial condyle of the patient's femur. Similarly, the lateral articular surface 2522, which extends from the anterior end 2506 to the posterior end 2508 of the tibial knee prosthesis 2500, is curved and configured to articulate with a corresponding natural or prosthetic lateral condyle of the patient's femur. The bottom surface 2504, however, has a planar base surface 2510 and a pair of protrusions 2550, 2552 that extend away from (e.g., inferiorly) the planar base surface 2510.

Figure 28:
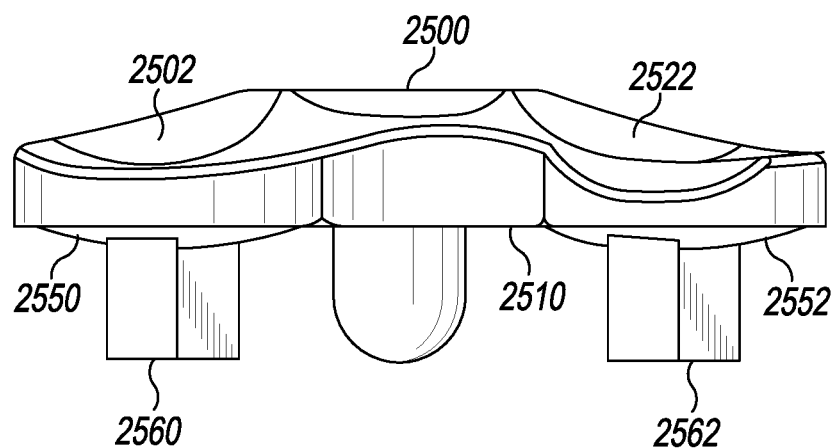
FIG. 28 is posterior elevation view of the tibial total knee prosthesis of FIG. 25.
Figure 29:
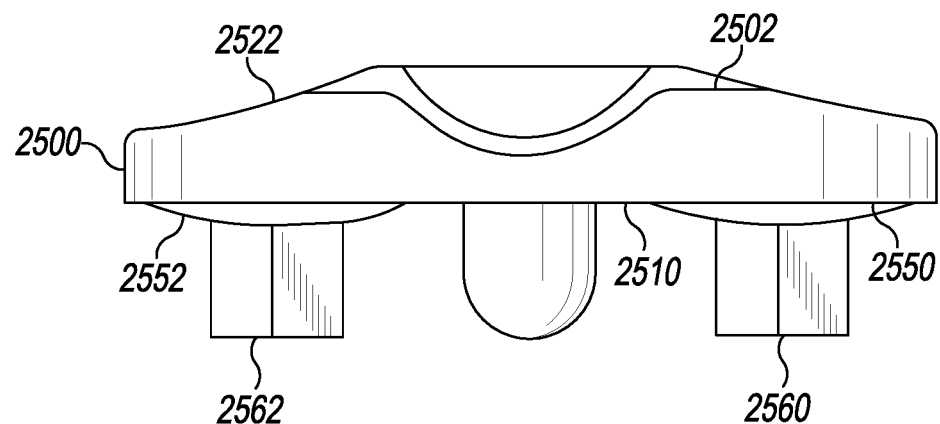
FIG. 29 is an anterior elevation view of the tibial total knee prosthesis of FIG. 25.
Figure 30:
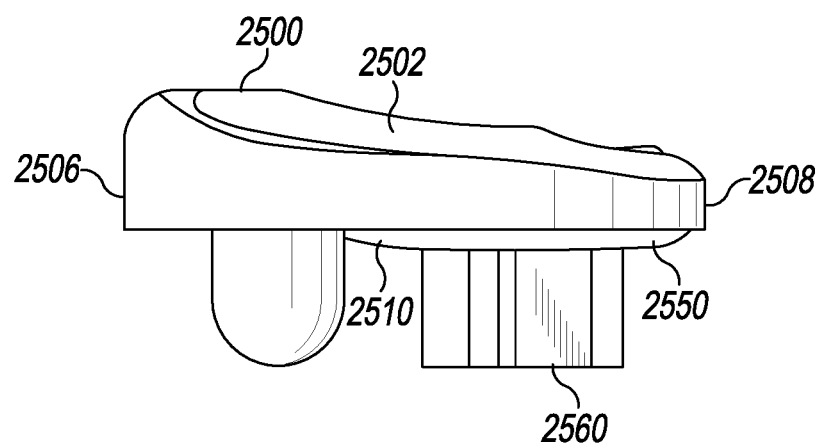
FIG. 30 is a side elevation view of the tibial total knee prosthesis of FIG. 25.
Figure 31:
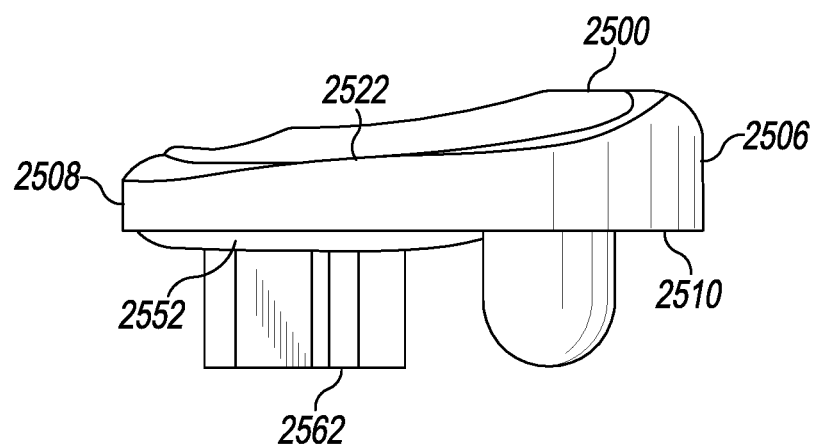
FIG. 31 is another side elevation view of the tibial total knee prosthesis of FIG. 25.

Each of the protrusions 2550, 2552 of the tibial knee prosthesis 2500 may be substantially similar to the protrusion 1620 described above. For example, each protrusion 2550, 2552 has a curved outer surface that has a convex curvature that mirrors a concave curvature of the corresponding medial or lateral articular surface 2502, 2522 in the area of the corresponding protrusion 2550, 2552. For example, as best shown in FIGS. 28 and 29, the medial articular surface 2502 is concave in the anterior-posterior direction when viewed in the sagittal plane, and the curved outer surface of the protrusion 2550 is convex in the anterior-posterior direction when viewed in the sagittal plane. Similarly, the lateral articular surface 2522 is concave in the anterior-posterior direction when viewed in the sagittal plane, and the curved outer surface of the protrusion 2552 is convex in the anterior-posterior direction when viewed in the sagittal plane. Additionally, as best shown in FIGS. 30 and 31, the medial articular surface 2502 is concave in the medial-lateral direction when viewed in the coronal plane, and the curved outer surface of the protrusion 2550 is convex in the medial-lateral direction when viewed in the coronal plane. Similarly, the lateral articular surface 2522 is concave in the medial-lateral direction when viewed in the coronal plane, and the curved outer surface of the protrusion 2552 is convex in the medial-lateral direction when viewed in the coronal plane.

Each of the protrusions 2550, 2552 are each illustratively hemi-ellipsoidal in shape but may have a different shape in other embodiments. Additionally, although the tibial knee prosthesis 2500 includes two protrusions 2550, 2552 in the illustrative embodiment, the tibial knee prosthesis 2500 may include additional or fewer protrusions 2550, 2552 in other embodiments. Each of the protrusion 2550, 2552 is aligned with a dwell point of the corresponding medial/lateral articular surface 2502, 2522 such that the thickness of each protrusion 2550, 2552 (i.e., the perpendicular distance between the outer surface of each protrusion 2550, 2552 and the corresponding medial/lateral articular surface 2502, 2522) of satisfies the minimum thickness (e.g., 6-8 millimeters). As discussed above, because the dwell points of the articular surfaces 2502, 2522 are located toward the posterior end 2508, each protrusion 2550, 2552 is likewise offset toward the posterior end 2508. Additionally, in the illustrative embodiment, each protrusion 2550, 2552 includes a peg 2560, 2562, respectively, extending from the curved outer surface of the corresponding protrusion 2550, 2552.

It should be appreciated that the tibial knee prosthesis 2500 may be of modular or unitary design. For example, in some embodiments, the tibial knee prosthesis 2500 includes a tibial insert, which includes the articular surfaces 2502, 2522, and a tibial tray. In such embodiments, the tibial insert may be removably attached to the tibial tray to form the tibial knee prosthesis 2500. In other embodiments, the tibial insert of the tibial knee prosthesis 2500 is attached (e.g., molded to) the tibial tray of the tibial knee prosthesis 2500. For example, the tibial tray may have a porous coating or exterior surface to facilitate the attachment of the tibial insert. Such designs are commonly referred to as "monolithic" tibial prostheses.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A tibial knee prosthesis comprising:
   an anterior side and a posterior side;
   a polymer tibial insert including a medial articular surface and a lateral articular surface, wherein (i) the medial articular surface extends from the anterior side to the posterior side and is configured to articulate with a medial condyle of a natural or prosthetic femur and (ii) the lateral articular surface extends from the anterior side to the posterior side and configured to articulate with a lateral condyle of the natural or prosthetic femur; and
   a metallic platform attached to the polymer tibial insert and including a bottom surface, opposite the medial and lateral articular surfaces, extending from the anterior side to the posterior side, wherein the bottom surface includes a planar base surface and a protrusion extending from the planar base surface below the medial articular surface or the lateral articular surface, wherein the protrusion has a curved outer surface having a convex curvature that is equal to a concave curvature of the corresponding medial or lateral articular surface located above the protrusion and wherein a perpendicular distance between the medial articular surface and the curved outer surface of the protrusion or between the lateral articular surface and the curved outer surface of the protrusion defines a thickness of the protrusion, and wherein the thickness of the protrusion is constant between an anterior end and a posterior end and in the range of six to eight millimeters, and
   wherein the metallic platform further includes a first peg extending inferiorly from the protrusion, the first peg including a proximal end attached to the protrusion and located inferiorly relative to the planar base surface of the bottom surface, and a second peg extending from the planar base surface and comprising a cross-section different from a cross-section of the first peg.

2. The tibial knee prosthesis of claim 1, wherein each of the medial articular surface and the lateral articular surface has a concave shape when viewed in a sagittal plane, and
   wherein the protrusion of the bottom surface has a convex shape when viewed in the sagittal plane.

3. The tibial knee prosthesis of claim 1, wherein the first peg comprises a hexagonal cross-section.

4. The tibial knee prosthesis of claim 1, wherein the second peg comprises a circular cross-section.

5. The tibial knee prosthesis of claim 1, further comprising a third peg shaped similarly to the first peg.

6. A tibial knee prosthesis comprising:
   an anterior side and a posterior side;
   an articular surface that extends from the anterior side to the posterior side and is configured to articulate with a corresponding condyle of a natural or prosthetic femur;
   a bottom surface, opposite the articular surface, extending from the anterior side to the posterior side, wherein the bottom surface includes a planar base surface and a protrusion extending from the planar base surface below the articular surface, wherein the protrusion has a curved outer surface having a convex curvature that is equal to a concave curvature of the corresponding articular surface located above the protrusion and wherein a perpendicular distance between the articular surface and the curved outer surface of the protrusion defines a thickness of the protrusion, and wherein the thickness of the protrusion is constant between an anterior end and a posterior end and in the range of six to eight millimeters;
   a first peg extending inferiorly from the protrusion, the first peg including a proximal end attached to the protrusion and located inferiorly relative to the planar base surface of the bottom surface; and
   a second peg extending from the planar base surface and comprising a cross-section different from a cross-section of the first peg.

7. The tibial knee prosthesis of claim 6, wherein the articular surface has a concave shape when viewed in a sagittal plane, and
   wherein the protrusion of the bottom surface has a convex shape when viewed in the sagittal plane.

8. The tibial knee prosthesis of claim 6, wherein the first peg comprises a hexagonal cross-section.

9. The tibial knee prosthesis of claim 6, wherein the second peg comprises a circular cross-section.

10. The tibial knee prosthesis of claim 6, further comprising a third peg shaped similarly to the first peg.

* * * * *